United States Patent [19]

Petty

[11] Patent Number: 5,784,633
[45] Date of Patent: Jul. 21, 1998

[54] SYSTEM FOR OBTAINING STATUS DATA UNRELATED TO USER DATA PATH FROM A MODEM AND PROVIDING CONTROL DATA TO THE MODEM WITHOUT INTERRUPTING USER DATA FLOW

[75] Inventor: John Stewart Petty, Chapel Hill, N.C.

[73] Assignee: International Business Machines Corporation, Armonk, N.Y.

[21] Appl. No.: 614,461

[22] Filed: Mar. 12, 1996

[51] Int. Cl.⁶ .............................. G06F 13/00; G06F 13/20
[52] U.S. Cl. ................ 395/880; 395/200.43; 395/200.68; 395/885; 395/500; 345/222; 375/220
[58] Field of Search ..................... 395/200.3, 200.43, 395/200.68, 880, 500, 885; 345/222; 375/220

[56] References Cited

U.S. PATENT DOCUMENTS

| | | | |
|---|---|---|---|
| 4,549,302 | 10/1985 | Heatherington | 375/8 |
| 4,837,785 | 6/1989 | McAlpine | 370/85 |
| 4,924,426 | 5/1990 | Kameda et al. | 364/900 |
| 4,926,448 | 5/1990 | Kraul et al. | 375/121 |
| 5,263,025 | 11/1993 | Torii et al. | 370/94.2 |
| 5,280,483 | 1/1994 | Kamoi et al. | 370/94.1 |
| 5,335,222 | 8/1994 | Kamoi et al. | 370/60 |
| 5,353,431 | 10/1994 | Doyle et al. | 395/425 |
| 5,392,223 | 2/1995 | Caci | 364/514 |
| 5,450,530 | 9/1995 | Snyder et al. | 375/220 |
| 5,644,593 | 7/1997 | Bailey et al. | 345/222 |
| 5,659,686 | 8/1997 | Hou | 395/200.68 |

FOREIGN PATENT DOCUMENTS 0617369  10/1994  European Pat. Off. .

OTHER PUBLICATIONS

IBM, TDB, vol. 37, #9, Sep. 1994, pp. 515–517.
TIA/EIA Standard, Jun. 1992, pp. 1–2.
Technical Reference for Hayes Modem Users, pp. 1-1-1-4.
PC16550C/NS16550AF Universal Asynchronous Receiver/Transmitter w/ FIFOs, p. IEEE Spectrum, Jun. 1992, The future is in the PC cards, pp. 46–49.

Primary Examiner—Christopher B. Shin
Assistant Examiner—Rehana Perveen
Attorney, Agent, or Firm—John D. Flynn

[57] ABSTRACT

A system and method for providing for simultaneous transmission of user data (the I/O data between a source DTE and a destination DTE) and control and/or status data (the data that the DTE conveys for DCE control and the data the DTE retrieves from the DCE for status purposes, respectively) comprises multiple data paths for the user, control and status data. The user data path utilizes an I/O space while the status and the control data utilize a memory space. Further, an interrupt generator is implemented to indicate to the DCE that a new control command has been received by the DCE. The implementation of this system and method foregoes the requirement of disrupting user data flow or modifying user data flow if there is a need for retrieving DCE status data or for sending to the DCE new control information.

25 Claims, 7 Drawing Sheets

SYSTEM FOR OBTAINING STATUS DATA UNRELATED TO USER DATA PATH FROM A MODEM AND PROVIDING CONTROL DATA TO THE MODEM WITHOUT INTERRUPTING USER DATA FLOW

BACKGROUND OF THE INVENTION

Related Applications

Method and System for Modem Command Processing During Data Transfer, IBM Docket No.: BC9-92-050, Ser. No.: 07/860,383 filed on 30 Mar. 1992.

I. Field of the Invention

The present invention relates to the transmission of data between a data terminal equipment (DTE) and a data circuit-terminating equipment (DCE) and, more particularly, to a system and method for providing for the simultaneous flow of user data and control and/or status data between a DTE and a DCE.

II. Background and Prior Art

In today's networking environment, a user of DTE, such as an IBM ThinkPad® laptop personal computer (PC), wishes to transmit data to another user utilizing a second DTE. This is normally accomplished by each user utilizing, with each DTE, a DCE, such as a modem. If either of the users wishes to send (or receive) the data via the cellular network, a cellular modem, such as an IBM® Personal Computer Memory Card International Association (PCMCIA) Cellular/CDPD Modem can be used.

In order for a DTE (source DTE) to utilize a DCE (source DCE) for communicating with another DTE (destination DTE), the source DTE must be able to convey and receive three types of data to and from the DCE: 1) user data, which is the data that flows from the source DTE to the destination DTE; 2) command data, which is the local data that the source DTE conveys to the source DCE for providing control of the source DCE; and 3) status data, which is the local data which flows from the source DCE to the source DTE identifying various parameters that the source DTE may be interested in. It should be noted that, at the destination end, the same types of data may be exchanged between the destination DTE and the destination DCE (commonly, the answering modem uses "ahto" answer such that no command or status data flows).

Communications flow from a source DTE to a destination DTE using a source DCE and destination DCE, respectively. The source DTE communicates with the destination DTE by sending user data (the end-to-end data that the source DTE wishes to convey to the destination DTE) and receiving user data (the end-to-end data that the destination DTE wishes to convey to the source DTE) over a cellular network. The DCEs each provide an interface for the DTEs (respectively) to the communications network (e.g., cellular network).

As was discussed briefly above, in order to convey user data over a cellular network, the source DTE needs to convey to the source DCE various data—in addition to the user data to be ultimately conveyed to destination DTE. For instance, source DTE needs to convey certain control data, such as the various commands necessary for the source DCE to understand what functions the source DTE wants to perform. In the present example using cellular modems, the source DTE would have to send commands such as "go off-hook", "dial telephone number", "transmit at X power level", etc . . . Upon receiving these commands, the source DCE is able to carry out or execute the functions these commands require. This data is local data and is not sent over the cellular network or other communications link.

Furthermore, the source DTE may wish to retrieve status data from the source DCE. Status parameters that the source DTE may want to inspect are battery power level (where the wireless modem has its own battery), transmit level, user data error rates, signal quality information, etc . . . The status data is local data and is not conveyed over the cellular network.

Two types of data (control and status) as well as the user data flow between DTE and DCE. Using standard DCEs (utilizing a serial communications port), however, user data cannot be conveyed between a DTE and a DCE simultaneously with either types of local data—status or control. That is, a standard serial communication port can send a single stream of serial data and receive a single stream of serial data. Note that both synchronous and asynchronous ports have this limitation since its the serial nature of the port that produces the limitation.

In asynchronous communications, there is no standardized protocol that allows portions of either serial data stream to be identified as local data or user data. (This differs markedly from synchronous communications ports in which data is normally sent in packets with defined address and "type" fields.) Although a standard asynchronous communication port has signal wires/bits in addition to the two serial data paths, none of the signals are used to differentiate between user data and local data. Thus, in asynchronous communications, there is no way to intermix local data and user data. Furthermore, there is no way to quickly switch the communication port between local and user data with a signal.

A series of preselected commands, typically known as "AT" commands may be utilized to set internal parameters for the DCE and instruct the DCE in operation. Known DCE modem/radio systems typically operate in one of two different modes of operation. In a first mode of operation, the device recognizes all characters transmitted to the device as command or command data. This mode is referred to as command mode. The other mode treats characters received at the DCE as data to be transmitted via a communications link. This mode of operation is referred to as data mode.

Thus, using present systems, after a source DTE has begun conveying user data to its associated DCE for transmission to the destination DTE (via the destination DCE), the interface between the DTE and DCE must be switched from user data to local data in order to retrieve status data or to convey control data. Thus, the DCE must be switched from data mode to command mode to receive status data and then switched back to data mode. This is presently accomplished by the DTE conveying the well-known "AT escape sequence" to the DCE. The AT escape sequence is a predefined sequence that is recognized by the DCE as an interrupt from its DTE. The DCE responds to such an interrupt by ceasing to convey user data over the DTE/DCE interface and by receiving the subsequent messages as control messages from the DTE or by providing status messages to the DTE. In detail, the "AT escape sequence" typically works as follows:

1. the DTE stops sending user data to the DCE;
2. the DTE waits for at least one second;
3. the DTE sends three consecutive "+" characters ("+++") to the DCE;
4. the DCE receives the "+++" string and waits for one second;
5. the DCE stops sending/receiving user data to/from the DTE;
6. the DCE sends an "OK" message to the DTE; and 7. the DTE sends control data (or, alternatively, requests & receives status data).
8. the DTE sends "ATO" to the DCE to restart sending/receiving user data to/from the DCE.

This manner of transferring back and forth between command and data modes of operation has proven quite adequate for devices which communicate via telephone land lines. Such devices have been widely accepted within the industry. This toggling concept works largely because the command mode and data mode are substantially divorced from one another, without the need to switch frequently from one mode to the second mode. This is generally due to the low bit error rates present in land line systems and the fact that a standard modem/DCE has little information to provide to the DTE regarding DCE status or line operation. In contrast, modem/radio systems possess substantial amounts of information regarding the DCE and communications channel operation.

For example, when utilizing a cellular telephone/modem to transmit data it would be helpful to the operator to possess information regarding how well the cellular telephone radio link is operating at a particular moment. This information may be utilized by the operator to make decisions regarding data throughput. If data throughput is low, the operator may choose to select a different transmission protocol or to increase the power of the radio transmitter. For example, a low Received Signal Strength Indicator (RSSI) may alert the operator to increase the transmitter power so that the receiving station may receive a clear signal. The Received Signal Strength Indicator (RSSI) and a continuous Service Access Tone (SAT) are two indications of cellular telephone channel quality which are typically present within a known cellular telephone system. Additionally, information about the bit error rate experienced within the cellular telephone transmission channel may also be utilized by the operator to choose protocols that enhance the efficiency of data transfer.

While existing cellular telephone systems may provide channel information, such as Received Signal Strength Indicator (RSSI), Service Access Tone (SAT), bit error rates, packet counts, these important operational parameters are not generally available to data radio operators via the DTE during user data transmission. In order to access this information utilizing known data radio devices, the data transmission mode must be terminated and the operator, via the DTE, must enter the command mode in order to query the status of these various parameters.

From the foregoing it can be seen that there are two major drawbacks to this approach. First, it takes a relatively long time (approximately two seconds) to switch between the two modes, i.e., the "user data mode" wherein user data is being conveyed between the DTE/DCE and the "on-line command mode" wherein local data is being conveyed between the DTE/DCE. This poses a serious problem if, for example, the user wishes to receive DCE status data every couple of seconds, there would be no time left for conveying user data. In a mobile environment, where the user is utilizing a laptop PC (as a DTE) and a cellular modem (as a DCE), this problem can be critical as the user may wish to monitor the modem battery power or the communications link parameters frequently so that a communications link is not lost or performs adequately. However, obtaining this status information dramatically impacts user data transmission speed and user data throughput.

Second, in systems utilizing Windows, OS/2® and DOS, only one entity "owns" a communications port to transfer user data so that no other application may send or receive status or user data until the first application relinquishes the port. For example, Procomm—a common general purpose communication program, and the specialized communication software used to access on-line services such as Prodigy and America On-line, have no concept of switching between user and local data. The programs, which run on the DTE, support local data only for the purpose of establishing and terminating a connection. Thus, if a user is using any of these standard software programs, there is no way for the user to get any status information from the DCE during a connection because the software application "owns" the DTE's communication port.

Presently, there is no system or method of simultaneously and asynchronously transmitting user data and status or control data between a DTE and a DCE. There is a need for such a system and method especially as the demand for greater bandwidth and speed as well as mobility increase in the marketplace.

SUMMARY OF THE INVENTION

The above-mentioned needs have been met in accordance with the present invention by providing an apparatus and method for the simultaneous transmission of user data (the I/O data between a source DTE and a destination DTE) and control and/or status data (the data that the DTE conveys for DCE control and the data the DTE retrieves from the DCE for status purposes, respectively) via a communications port having multiple data paths for the user, control and status data. In the preferred implementation, the user data path utilizes the I/O memory while the status and the control data utilize memory. Further, an interrupt generator can be implemented to indicate to the DCE that a new control command has been received by the DCE. The implementation of this system and method foregoes the requirement of disrupting user data flow, or modifying the user data flow, if there is a need for retrieving DCE status data or for sending to the DCE new control information.

It is an object of the invention to provide simultaneous user and control/status data between a DTE and a DCE.

It is an object of the invention to maximize user data throughput between a DTE and a DCE.

It is another object of the invention to maximize the user data throughput on a communications link while still providing status data for DCE.

It is a further object of the invention to provide DCE and/or communications link status information without interrupting user data flow.

It is still a further object of the invention to provide DCE and/or communications link status information without switching to command mode.

It is a yet further object of the invention to provide DCE and/or communications link status information without embedding special characters in the user data stream.

It is yet another object of the invention to provide DCE and/or communications link status information to more than one application.

It is still another object of the invention to provide user data to a first application in the DTE while providing status information to a second application in the DTE.

It is an object of the invention to provide commands and/or control information to the DCE without interrupting or modifying user data flow.

It is still a further object of the invention to provide commands and/or control information for the DCE without switching to command mode.

It is a yet further object of the invention to provide DCE commands and/or control information without embedding special characters in the user data stream.

It is a yet further object of the invention to provide DCE commands and/or control information without impacting user data stream throughput.

BRIEF DESCRIPTION OF THE DRAWINGS

While the technical description concludes with claims particularly pointing out and distinctly claiming that which is regarded as the invention, details of a preferred embodiment of the invention may be more readily ascertained from the following technical description when read in conjunction with the accompanying drawings, where:

DETAILED DESCRIPTION OF THE PREFERRED EMBODIMENT

Figure 1:
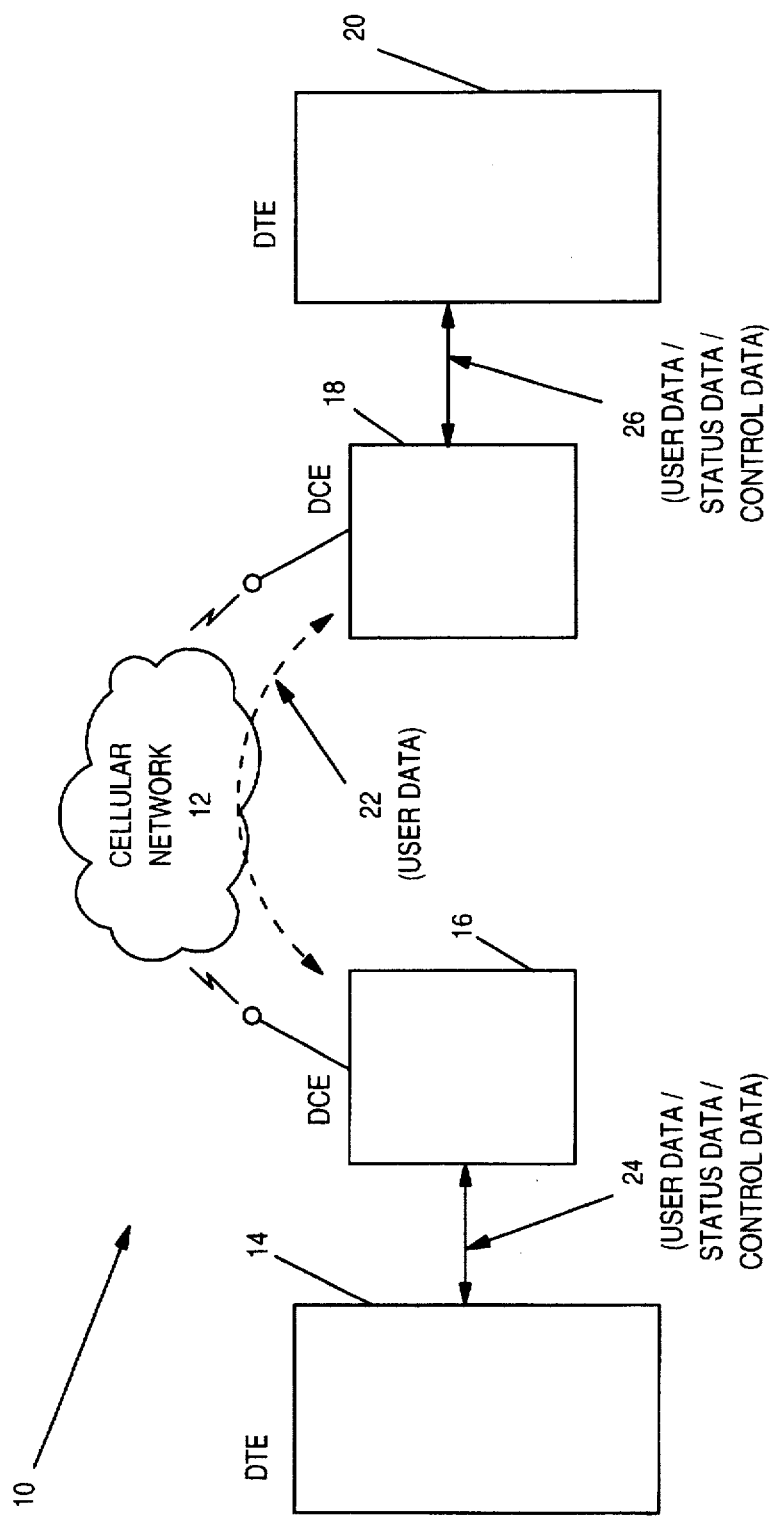
FIG. 1 is a block diagram illustrating a communications network wherein two DTEs, each using a DCE, are communicating over a cellular network.

FIG. 1 illustrates a communications system. The communications system consists of a backbone cellular network 12 over which data and other types of information (such as voice) are provided. Although, the preferred embodiment of the present invention is described with respect to a cellular network it is applicable to any type of communications network. FIG. 1 shows a first DTE 14, a first DCE 16, a second DCE 18 and a second DTE 20. FIG. 1 illustrates an environment where DTE 14 communicates with DTE 20 using DCE 16 and DCE 18, respectively. As can be seen, DTE 14 is able to communicate with DTE 20 by sending user data (the end-to-end data that DTE 14 wishes to convey to DTE 20) and receiving user data (the end-to-end data that DTE 20 wishes to convey to DTE 14) over the cellular network 12. This is shown by arrow 22. DCE 16 and DCE 18 each provide an interface for the DTE 14 and DTE 20 (respectively) to the cellular network. The cellular network 12 may actually comprise, in large part, portions of the land line public switched telephone network (PSTN) but is shown for simplicity as an independent network. DCE 16 and DCE 18 are, in the preferred embodiment, cellular modems conforming to the PCMCIA Standard Release 2.1, which is hereby incorporated by reference. Note that, DCE 16 and DCE 18 could be standard land line modems providing an interface (for DTE 14 and DTE 20, respectively) directly to a PSTN. The DCEs may also be mixed. For instance, DCE 16 can be a land-line modem with DCE 18 as a wireless modem.

Figure 2:
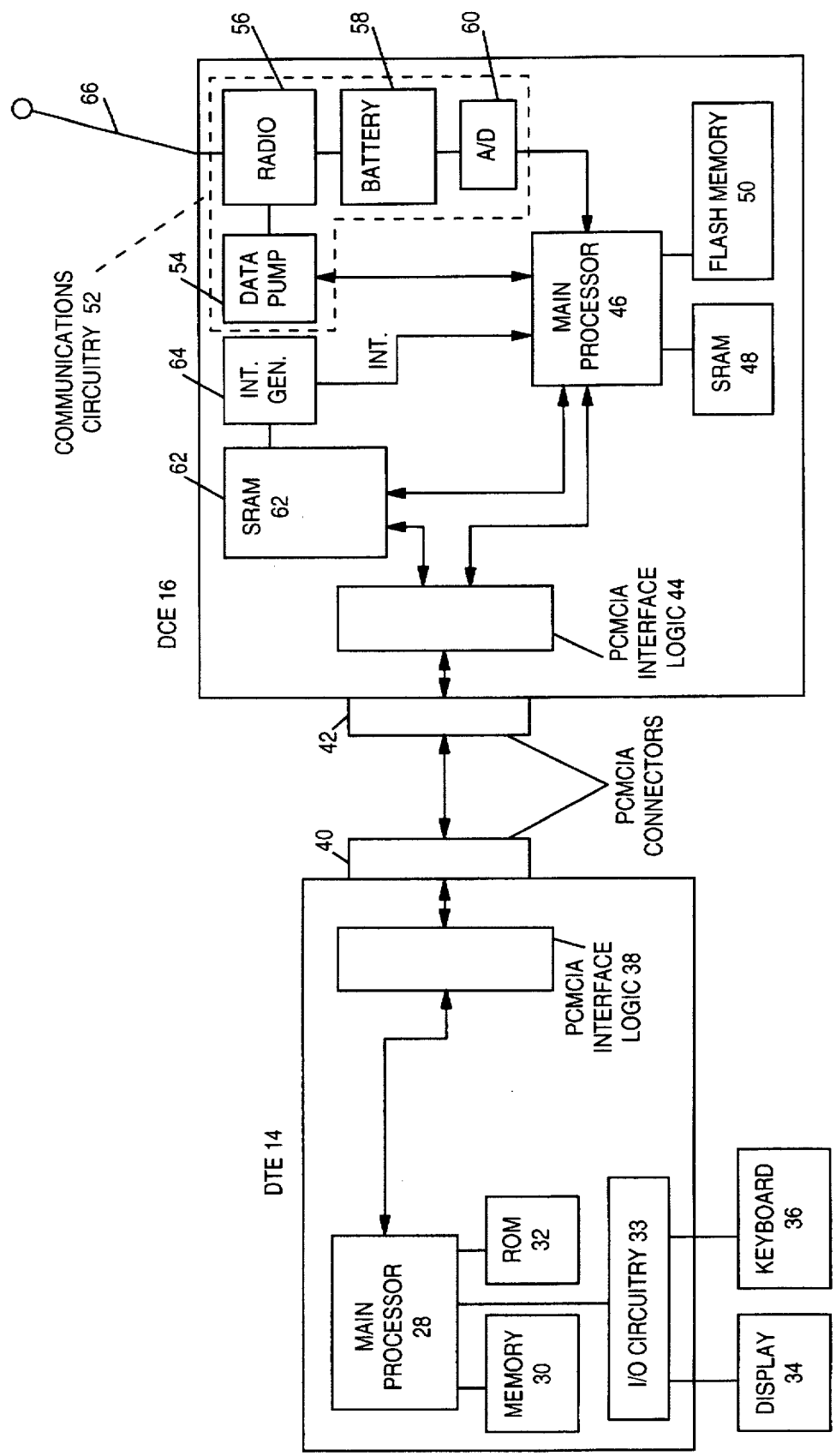
FIG. 2 is a block diagram illustrating the system of the present invention in greater detail.

FIG. 2 illustrates in greater detail the system of the present invention. DTE 14 is, in the present example, a general purpose computer (such as an IBM® ThinkPad® laptop computer). For the purposes of this specification, "DTE" is used as a generic term used to describe the end-user machine, which is usually a computer or terminal or lap top or palm top or hand held or personal digital assistant or other computer. Also, for the purposes of this specification, "DCE" was used as a generic term used to describe the machine which provides an interface for the DTE into a communications network, such as a modem. A DTE may be a mobile battery powered computer which includes a low power display system which preferable provides a display screen which may be implemented utilizing a liquid crystal displays (LCD), a gas plasma display or any other suitable technology. Although a portable or mobile computer is used in the preferred embodiment, the present invention can work with any computer. As shown in FIG. 2, a computer comprising a main processor 28, a memory 30, non-volatile memory 32, a display 34, and a keyboard 36 for inputting data. Note that the keyboard may be replaced by or supplemented with input devices including a mouse or keypad or voice sensors or image sensors or other pointing devices. Other pointing devices include tablets, numeric keypads, touch screen, touch screen overlays, track balls, joy sticks, light pens, thumb wheels, buttons etc... The main processor can also be connected to communications lines, disk storage, input devices, output devices or other I/O equipment. Any number of other components may be attached to (or reside in) the DTE such as printers, facsimile machines, etc. . . . , and all are interconnected within (or to) the DTE via a bus structure, as is well known in the art.

In the preferred embodiment the DTE provides slots for accepting Cards that meet applicable Personal Computer Memory Card International Association (PCMCIA) standards. Note that although the present invention is described with respect to PCMCIA standards it may be used with other PC cards or adapter cards. For instance, cards containing dynamic random access memory (DRAM) has also been standardized. DRAM cards come in 60 pin and 88 pin versions and are primarily used for main memory expansion and not data transfer or I/O. PCMCIA has participated in the development of a standard for 68 pin credit card sized PC cards. Both data storage ("Memory") and peripheral expansion ("I/O") card types are defined by this standard. The PCMCIA standard provides an I/O capability which provides a standard for bus expansion slot so that peripherals like modems and LAN adapters can be used in PCMCIA slots. The present invention may also be used with any card or adapter that provides a serial port with memory access. For instance, adapter cards that combine modem function along with ETHERNET connectivity, so called "dual function cards". Note that although the present invention is described with respect to the preferred embodiment, PCMCIA Cards, it is applicable to internal modems and all cases wherein a DTE has access to the address/data bus of the DCE.

Returning to FIG. 2, the DTE 14 has PCMCIA interface logic 38 and a PCMCIA connector 40—both combined providing the DTE 14 with an interface to a PCMCIA adapter—in this case DCE 16. PCMCIA interface logic 38 and PCMCIA connector 40 conform to the PCMCIA Standard Release 2.1.

DCE 16 in the preferred embodiment is a PCMCIA wireless cellular adapter (i.e., modem or modem/cellular phone). This type of adapter conforms to the PCMCIA standard while providing the DTE with access to a cellular network by allowing data to be conveyed over the cellular network to another DTE at the other end. Such a DCE could also be used to convey voice via the cellular network if properly configured with a microphone, speaker, etc . . . DCE 16 comprises a PCMCIA connector 42 and PCMCIA interface logic 44 for providing the DCE with an interface to the DTE 14. DCE 16 further comprises a main processor 46 which utilizes supporting memory (i.e., in the preferred embodiment static random access memory RAM (SRAM 48) and/or flash memory 50) and communications circuitry 52 for providing physical access to a network or connection (i.e., the cellular network of the preferred embodiment). The communications circuitry 52, as is common among cellular modems, comprises a data pump 54, a radio 56 which has its own battery 58 and an analog/digital converter (A/D) 60 for determining the remaining battery power. An antenna 66 is used for transmitting and receiving the electromagnetic communications signals. Note also that communications link status information can be provided from Communications Circuitry 52 to the main processor 46 and that the main processor 46 can change communication parameters by sending commands to communication circuitry (i.e., transmit power, protocol information, signal processing to be utilized, etc ... ). The ability of the DCE Main Processor 46 to control and receive status information (BER, RSSI, SAT, packet count, packet size, battery power, connect state, connection speed, carrier information, sleep mode [Home, Roam, No serv], modem retrain, error information etc ... ) is an important feature of the present invention when used with cellular or wireless modems. In addition, DCE 16 comprises an additional memory (i.e., SRAM 62) and an interrupt generator (interrupt. Gen.) 64 which are described in further detail below. Note that various components of DCE 16 may be located externally from the PCMCIA card (i.e., the battery, antenna, radio). Also note that a Digital Signal Processor may be used to combine the data pump, main processor and interrupt generator functions.

Figure 3:
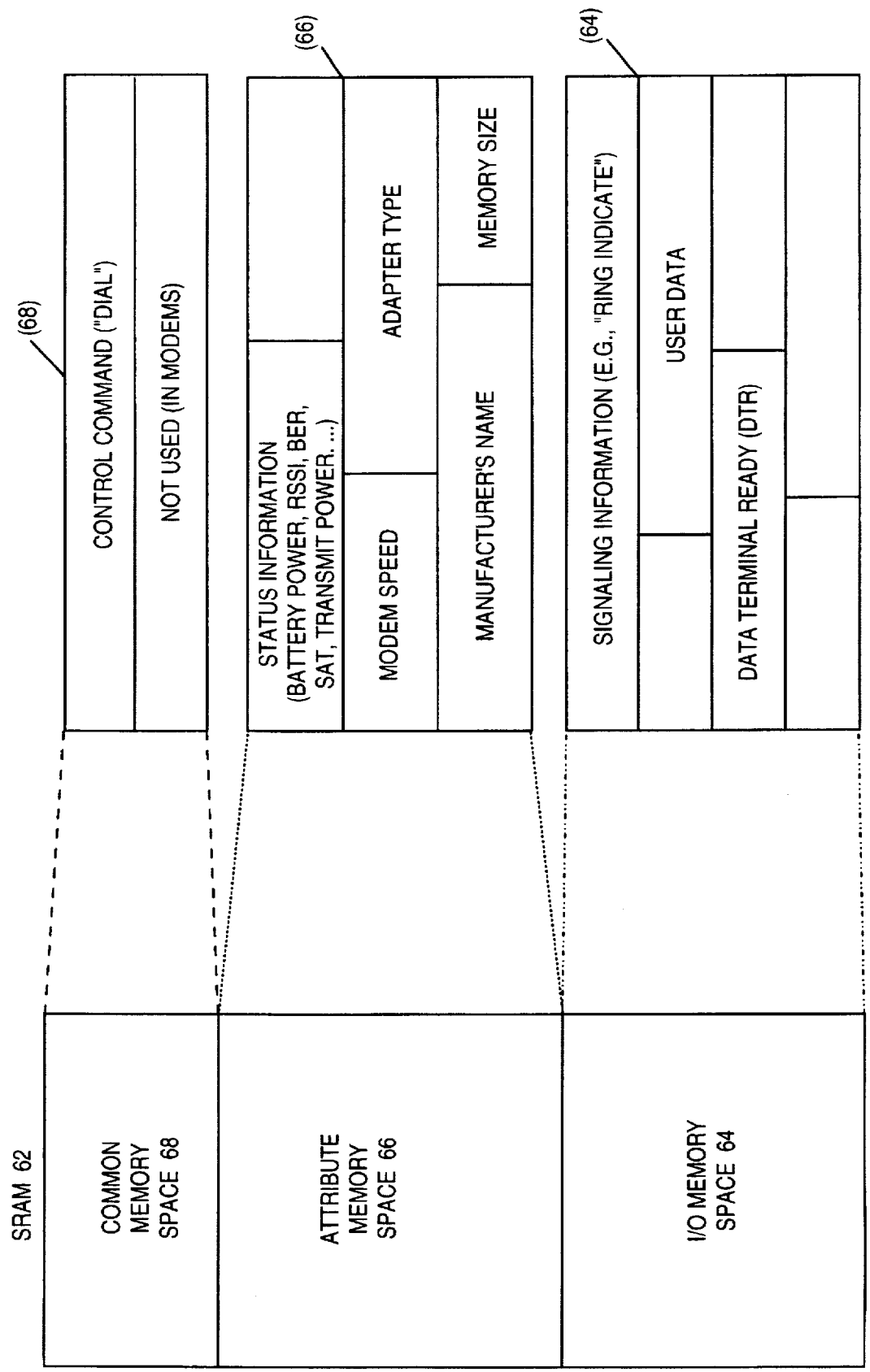
FIG. 3 is a block diagram illustrating the memory mapping of the memory used in the DCE of the present invention.

FIG. 3 illustrates SRAM 62 in greater detail. In particular, it illustrates the mapping of the memory, or the manner in which the SRAM space is allocated and used in the present invention. As can be seen, the SRAM 62 is logically separated into three different spaces—the I/O Memory Space 64, the Attribute Memory Space 66 and the Common Memory Space 68. Each of the memory spaces is shown in greater detail along the right hand side of the figure.

The I/O Memory Space 64, which is used by the DTE and DCE for conveying and receiving user data (and may also be used for necessary network data to establish call set-up), comprises space allocated for the user data ("I/O Port or UART Port") as well as signals used to transfer data to and from the port ("Interrupt Request", "I/O Read Strobe", "I/O Write Strobe", etc ... ). Not all of the information which is conveyed via the I/O Memory Space 64 is illustrated. The hardware interface of the PCMCIA standard Release 2.1 supports 64 Mbytes at 8 bits/address of I/O address space for peripheral device access. A typical asynchronous communications port is a UART using 8 bytes. The I/O address space of the DCE looks to the DTE as a Universal Asynchronous Receiver/Transmitter (UART). The DTE interacts with the I/O Memory space as if it were a serial port or UART. The eight continuous bits of the UART are mapped by the DTE somewhere into the DCE (i.e., the 64 Mbyte I/O address space for a PCMCIA Card).

In accordance with PCMCIA Release 2.1, Attribute Memory Space 66 is also allocated 64 Mbytes and is used generally to record card capacity and other configuration and attribute information. The Attribute Memory Space 66 is normally divided into three areas: 1) Card Information Structure (CIS)—a description of the card's capabilities and specifications; 2) Configuration Registers—an optional set of registers which allow the card to be configured by the system; and 3) Reserved Area—the portion of Attribute Memory space not yet specified. Examples of information found in the CIS are the adapter type, the manufacturer's name, the modem speed (where the adapter is a modem), and modulation standards (such as V.32bis, V.42, etc ... ), buffer sizes, flow control methods, error correction/detection protocols, data compression protocols, command protocols, escape mechanism, encryption specification, etc ... The CIS is a variable-length chain (or linked list) of data blocks called tuples. In the preferred embodiment of the present invention, status information of the card (such as "Battery Power Level") is passed to the DTE in the reserved space.

Also in accordance with PCMCIA Release 2.1, Common Memory Space 68 is also allocated 64 Mbytes and is normally used in LAN adapters and any other memory type adapters (i.e., SRAM cards, hard drives). In asynchronous I/O devices, such as a modem, this space is normally left unused. In the preferred embodiment of the present invention, DCE control commands from the DTE (such as "Dial") are passed to the DCE via the Common Memory Space 68.

This system of the present invention utilizes such a novel memory allocation structure so that I/O data, such as user data (i.e., a message, image, graphics, files, notes, video, text, and any other type of data), status data (i.e., battery power, received signal strength indicator (RSSI), service access tone (SAT), bit error rate, frequency, cellular channel, packet number, number of packet retires, retraining status, data buffer utilization, other communication channel information, other DCE status information), and control data (i.e., "Dial", Update Status, Change transmission speed or data rate, change communication protocol, change block size, change to power saving mode, change connection parameters, change transmit power level or adjust any other adjustable parameters etc ... ) may be conveyed simultaneously along three individual paths as will be discussed in greater detail below. It should be noted that, while the preferred embodiment shows the status data being stored in the Attribute Memory Space and the control data being stored in the Common Memory Space, other allocation schemes may be used as well. For instance, the control data could be stored in the Attribute Memory Space while the status data is stored in the Common Memory Space or both the control data and the status data could be stored in the Attribute Memory Space or Common Memory Space and so forth.

Figure 4:
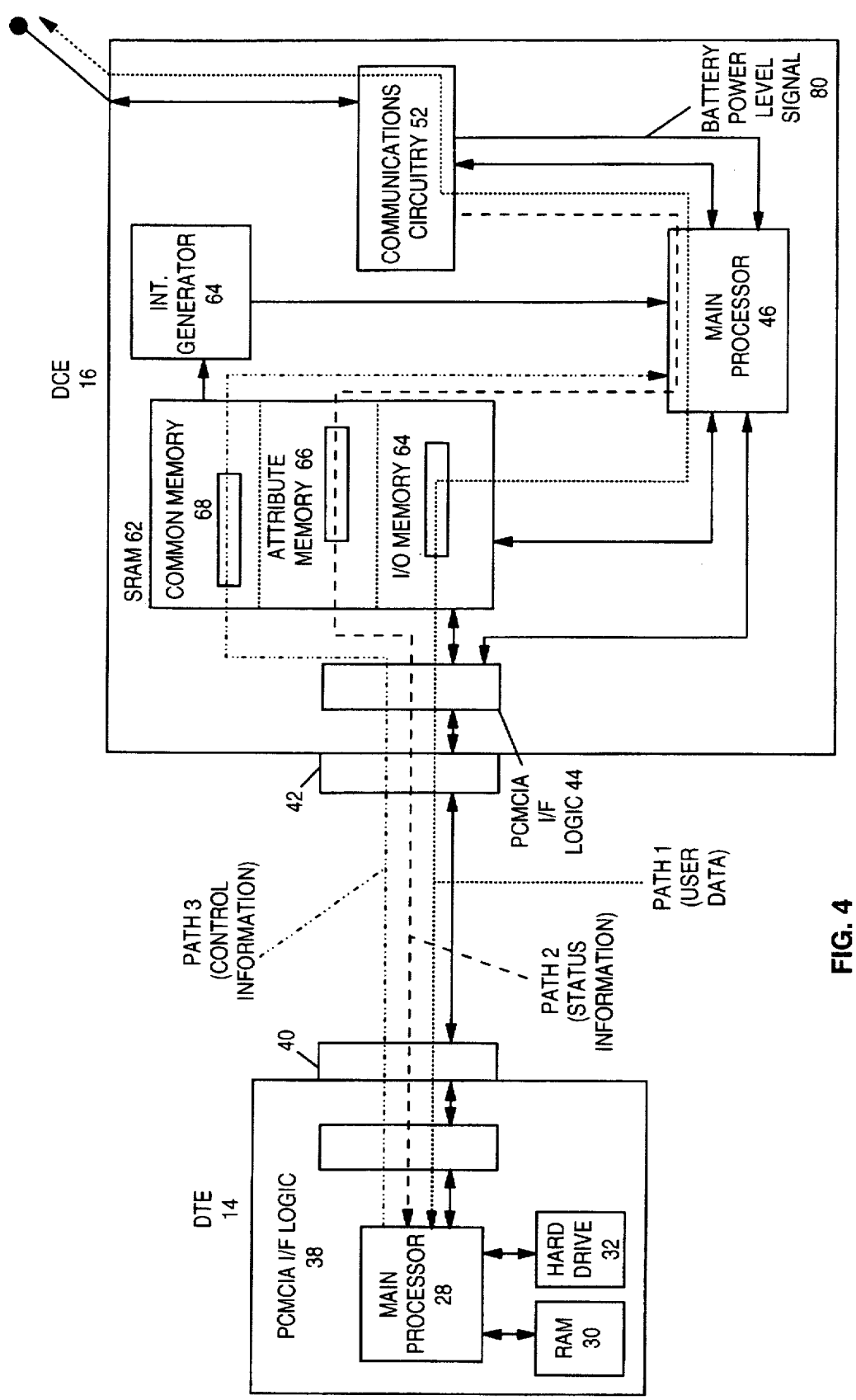
FIG. 4 is another block diagram of the system of the present invention illustrating the data flows through the DTE and the DCE of the present invention.

Referring now to FIG. 4, the system of the present invention is shown in operation and illustrates the plurality of data paths for the user, control and status data. (Many of the elements which were illustrated for informational purposes in FIG. 2 are intentionally omitted for clarity.) The figure illustrates in detail the data paths between the DTE 14 and the DCE 16 via the PCMCIA interface (PCMCIA Connectors 40, 42 and PCMCIA Interface Logic 38, 44). In particular, there are three data paths shown: a User Data Path (Path 1); a Status Information Path (Path 2); and a Control Data Path (Path 3).

As was discussed, the User Data Path is utilized for I/O type data—such as the data that is being conveyed from the source DTE to the destination DTE. Thus, the User Data Path comprises the DTE Main Processor 28, the DTE PCMCIA I/F Logic 38, the PCMCIA Connectors 40, 42, the DCE PCMCIA I/F Logic 44, the DCE I/O Memory Space 64, the DCE Main Processor 46 (and any interconnecting cabling or conductors when the radio is external to the PCMCIA card), the DCE Communications Circuitry 52, and the antenna 66. As indicated by the arrow, user data can flow in both directions. Thus, the DTE may receive data where the user data path for receiving data the antenna 66, DCE communications circuitry 52 (and any interconnecting cabling or conductors when the radio is external to the PCMCIA card), DCE main processor 46, the DCE I/O Memory Space 64, the DCE PCMCIA I/F Logic 44, the PCMCIA Connectors 42, 40 (and any interconnecting cabling), the DTE PCMCIA I/F Logic 38, and the DTE Main Processor 28. This path implements the UART functionality or asynchronous serial port functionality or modem function for the sending and receiving of user data. User data is the data that a first user wishes to convey to a second user.

The Status Information Path is utilized by the DTE 14 for retrieving various status data from the DCE 16—such as Battery Power Level. The Status Information Path comprises the following elements: the DTE Main Processor 28, the DTE PCMCIA I/F Logic 38, the PCMCIA Connectors 40, 42 (and any interconnecting cabling), the DCE PCMCIA I/F Logic 44, the DCE Attribute Memory Space 66, the DCE Main Processor 46, and the DCE Communications Circuitry 52. As indicated by the arrow, the status data flows to the DTE 14 from DCE 16. In the preferred embodiment, status data is written to the Attribute Memory Space by the DCE main Processor 46. Status data may be generated by the DCE processor 46 and/or may be obtained by the DCE main processor from the communications circuitry 52, battery and/or any other DCE components. The DCE main processor may update the status data in the Attribute Memory Space using an interrupt generator generating an interrupt in response to a status change, by the DCE periodically polling status generating components or in response to a update status command provided to the DCE main processor by the DTE main processor.

The Control Information Path is utilized by the DTE 14 for sending to the DCE 16 various control commands—such as a command to optimize a connection. The Control Information Path comprises the following elements: the DTE Main Processor 28, the DTE PCMCIA I/F Logic 38, the PCMCIA Connectors 40, 42, the DCE PCMCIA I/F Logic 44, the DCE Common Memory Space 68, the Interrupt Generator 64, and the DCE Main Processor 46. Note that control data may not actually flow through the interrupt generator 64, the interrupt generator may simply inform the DCE processor that a control parameter or command has been received from the DTE. The Interrupt Generator may also inform the DCE main processor of the location of the received command in the common memory or attribute memory space. Although the interrupt generator is the preferred method of informing the DCE main processor other techniques may be used such as the DCE main Processor polling memory locations of the Common memory and Attribute memory space or logic could be added to monitor the PCMCIA interface signals to detect a DTE write into common memory or attribute memory space and trap the appropriate address providing this information to the DCE main processor. As indicated by the arrow, the control data flows from the DTE 14 to the DCE 16.

In operation, the system of the present invention functions as follows. At power-up or card reset, the DTE Main Processor 28 retrieves (and stores for subsequent use) from the DCE Attribute Memory Space 66 the attributes stored therein by the manufacturer so that the DTE recognizes the adapter without the user having to know and input its relevant data. The processor then configures the card per the PCMCIA release 2.1 Note that before the link is established the user data path or the control path may be used to provide commands from the DTE to the DCE—at startup no user data is yet flowing across the user data path. When desired, the user activates communication software to cause end-to-end connection to be established.

During I/O operation, such as when DTE 14 wishes to send user data to a destination DTE 20 over a cellular link, DTE 14 conveys the data to the DCE 14 I/O Memory Space 64. This is accomplished via a normal PCMCIA I/O data transfer process comprising placing the data on the PCMCIA specified pins (as well as the I/O Port address) and strobing the I/O Write Strobe assuming that the call has previously been established over the cellular link. The DCE Main Processor 46 retrieves the data from the I/O Memory Space and forwards the data to the Communications Circuitry 52 for transmission via the Antenna 66 for conveyance to the Cellular Network 12 (FIG. 1). This entire data conveyance is via the User Data Path (Path 1). The DCE is treated as a PCMCIA I/O adapter card. Note that the DCE main processor may process the user data before forwarding the user data to the communications circuitry (or when receiving user data before writing it to I/O memory). Thus, the DCE processor may process the user data in accordance with one or more programs loaded into its associated memory. These programs can provide processing of the user data to provide encryption, decryption, compression, decompression, packetization, de-packetization, error detection, error correction and other communications related processing. The memory associated with the DCE processor (shown as SRAM 50 and SRAM 48 in FIG. 2) also contains other instructions for the DCE processor to carry-out overall DCE operation.

Where status information, such as battery power level, is to be retrieved from the DCE 16, the battery power level is conveyed from the Communications Circuitry 52 (via A/D 60—FIG. 2) to the DCE Main Processor 46 and is stored in Attribute Memory Space 66. Note that other types of status information (i.e., memory battery power) may also be obtained by the DCE main processor 46. Status information can be obtained from the communications circuitry and stored in the Attribute Memory Space 66. Note that the status information may be stored as tuples in the Attribute memory space 66 or any other format or data specification so long as the DTE knows of or can determine the data format. The DTE Main Processor 28, which may periodically interrogate the DCE 16 to determine if there are any status changes, retrieves the status information from the Attribute Memory Space 66. This information conveyance is via Status Information Path (Path 2). In the preferred embodiment the status information is obtained by the DTE Main processor reading the appropriate locations of the Attribute Memory Space of the DCE in accordance with the status information path described above.

Where control information, is to be conveyed to the DCE 16 from the DTE 14, DTE 14 conveys this information to the DCE 16 by writing the control information (i.e., commands and command parameters) to the Common Memory Space 68. The Interrupt Generator 64, which detects the content change in the Common Memory Space 68, generates an interrupt signal to the DCE Main Processor 46 when such a command is stored in the designated area of the Common Memory Space 68. Upon receiving the interrupt signal, the DCE Main Processor retrieves from the Common Memory Space 68 the command sent by the DTE 14 and acts upon it. This information conveyance is via Command Information Path (Path 3). Note that an additional feature of the present invention is that the DTE can send a status update command to the DCE wherein when the DCE processes the status update command it updates status information in the attribute memory space. After sending the update status command via the control path, the DTE receives status information via the status information path.

It should be noted that the user data provided to and received from the DCE via the DCE's I/O capability and the status/control data provided to and received from the DCE are simultaneous from the point of view of the DTE user and the user data flow across the DTE/DCE interface. For instance, a fast communication link can support 115 kilobits per second which is approximately 14,000 bytes per second which is roughly one byte every 70 microseconds. This is the user data flow. A PCMCIA interface typically runs at a speed of 0.1 to 0.3 microseconds per byte. Therefore, there is plenty of time for the DTE to keep user data flowing to and/or from the I/O Memory space of the DCE at full capacity in both directions and also obtain status information from and provide control information to attribute memory and/or common memory space of the DCE. Thus, user data is kept flowing without interruption while status data is obtained from, and control information is written to the DCE's non I/O memory address space.

It should also be noted that although there are only one set of address lines and one set of data lines provided by a PCMCIA interface the user data, status information and control information are considered to flow simultaneously as described above. When the DTE accesses the DCE it uses the address lines and other available PCMCIA signaling lines to access the I/O memory, attribute memory and common memory spaces accordingly. Note that the DTE, via the PCMCIA I/F writes or reads data accordingly to the appropriate memory space of the DCE. Using the PCMCIA interface specification, the IOREAD And IOWRITE signals when active, indicate that the bus is being used for I/O operation. The Output Enable and Write Enable signals when active indicate bus access is being used for attribute memory or common memory access. The attribute memory select signal (REG) distinguishes between attribute memory and common memory access.

Figure 5:
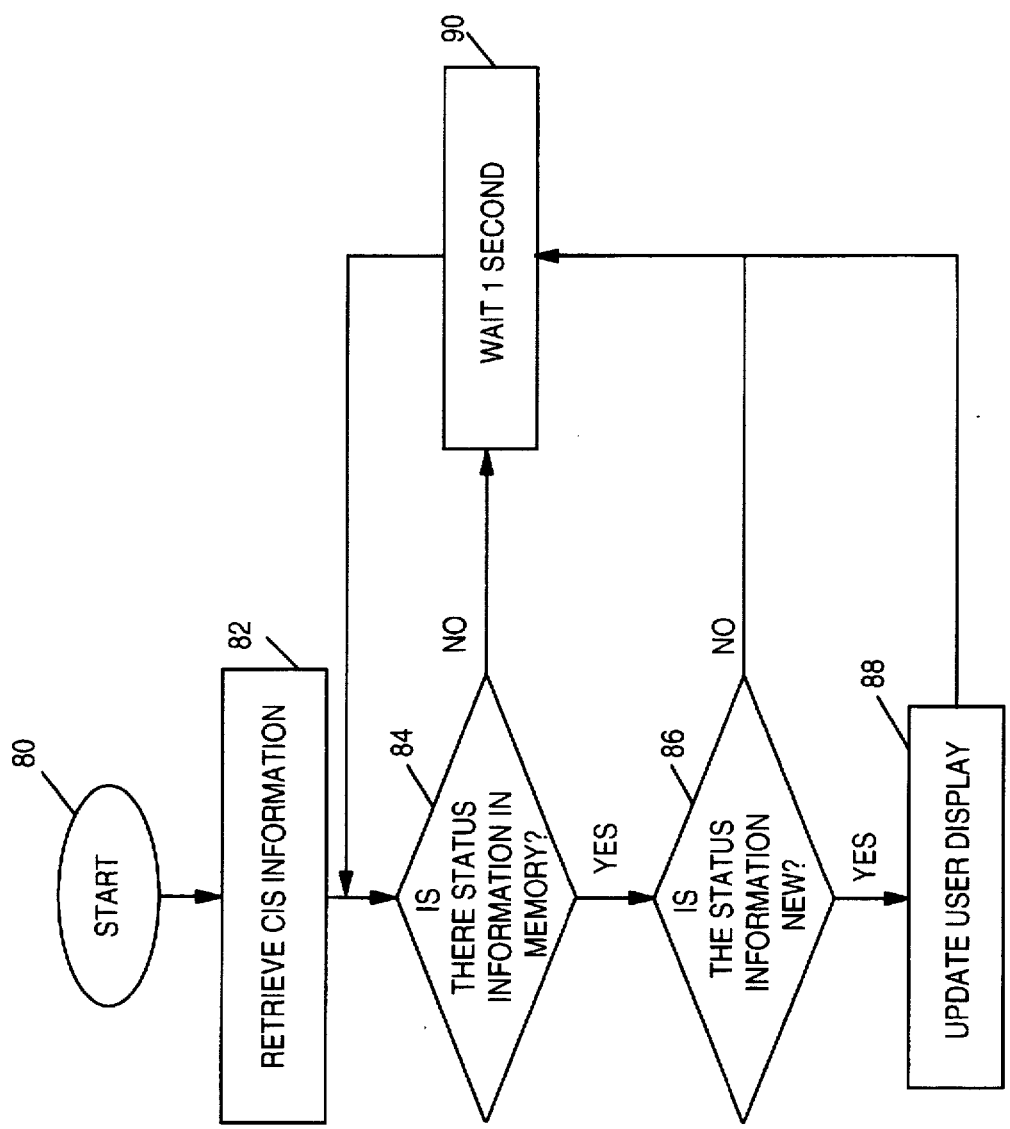
FIG. 5 is a flow chart illustrating the method used in the DTE in the present invention.
Figure 6:
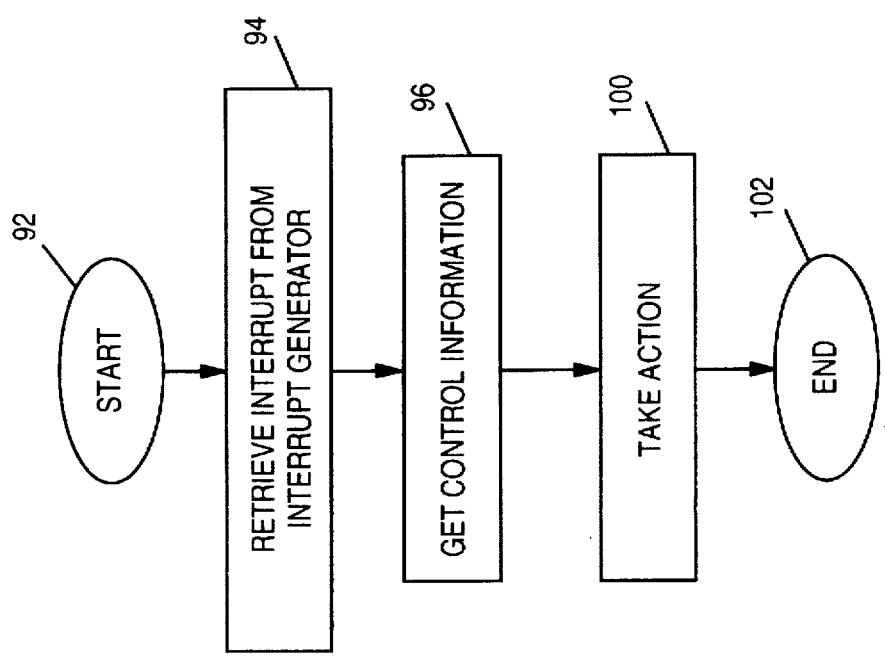
FIG. 6 is a flow chart illustrating the method used in the DCE in the present invention.

The methods implemented by the DTE of the present invention and the DCE of the present invention are shown in FIGS. 5 and 6, respectively. Referring first to FIG. 5, the method implemented in the DTE starts at 80 (after PC Card reset or power-up) and, at 82, the DTE retrieves the CIS information. At 84, the DTE determines whether there is any status information in the memory (in the Attribute Memory portion, in the preferred embodiment). This is accomplished by examining the contents of the memory for anything except the "no data present" content. If not, at 90, the DTE waits for a predetermined period of time, in this case, one second, and determines, again at 84, if there is any status. If there is, at 86, the DTE determines whether the status is new. This is accomplished by comparing the previously retrieved contents to the newly retrieved contents. If not, at 90, the DTE waits for a predetermined period of time, in this case, one second, and continues performing the loop described above. If so, at 88, the DTE performs some function with the new status data, such as updating the user display. The DTE may provide the DCE with commands based on the status information in order to maintain desired connectivity and throughput. Thus, in response to a high BER the DTE may send a command to the DCE to increase transmitter power. After the function is performed at 88, the DTE waits for a predetermined period of time at 90 and continues performing the loop described. In addition, the DTE is able to direct the DCE as to new status data that the DTE wants the DCE to collect (not shown in the flow chart). The retrieval of that information is performed in the manner described above.

FIG. 6 illustrates a flow chart showing the method utilized in the DCE for retrieving control information from the DTE. At 92, the method starts when an interrupt is received from the Interrupt Generator by the DCE Main Processor. At 94, the DCE Main Processor retrieves the interrupt. At 94, the DCE Main Processor retrieves the control information (from the Common Memory Space in the preferred embodiment). At 100, the DCE performs the function that was identified by the DTE in the retrieved control information. Alternatively, this could be accomplished via a polling scheme. However, the interrupt approach, as described, is faster and thus preferred.

The methods described in FIGS. 5 and 6 are performed simultaneously with the transmission of user (I/O) data. Thus, it can be seen that the method and system of the present invention allows for the simultaneous transmission of user data and control/status data between a DTE and a DCE so that the flow of user data is not disrupted while new status data needs to be retrieved from the DCE or new control information needs to be conveyed to the DCE.

Figure 7:
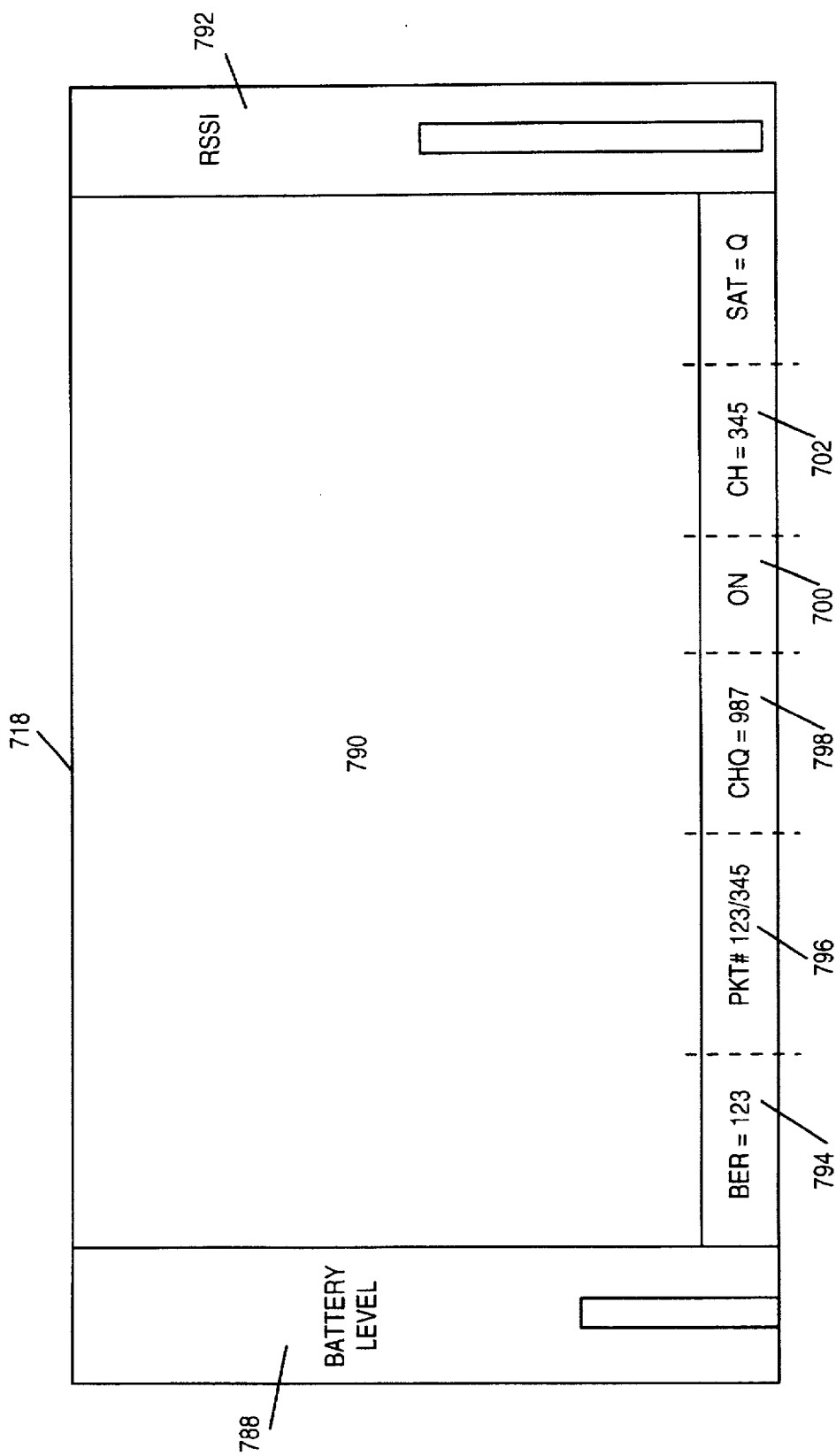
FIG. 7 is a display depicting status information from a Cellular communications link.

FIG. 7 depicts a pictorial representation of a computer display which depicts the display of communications status data obtained utilizing the present invention. This information may be presented to the user of the DTE. Based upon status information the user, or a software system monitoring status information, can make changes to improve the throughput of the communications link and/or conserve DCE battery power. As illustrated, window 790 is provided which may be utilized to display user data sent or received over the communications channel. Additionally, various communication channel and DCE status data may be displayed within the display area 718, representing a window of the DTE display. For example, DCE battery power and/or Received Signal Strength Indicator (RSSI) are graphically illustrated at 788 and 792, respectively as bar graphs where the length indicates remaining battery power and the decibels of received signal strength, respectively. Additional status information may also be displayed such as bit error rate 794, various packet numbers 796, channel quality indicators 798, carrier status indicators 700 and channel numbers 702 as well as other status information may be displayed. Although, not shown on FIG. 7, a user interface component such as a menu bar could be added that permitted the user to adjust communication parameters by sending commands to the DCE via the control path for execution by the DCE main processor. The user interface component(s) could provide the user with the ability to select among commands and command parameters. Thus for example, as the user observes increasing BER, the user interface could be used to select and issue command(s) to the DCE to increase transmitter power and/or lower the data rate.

Note that memory associated with the DTE main processor 28 contains one or more programs such as a communications programs, communications monitoring programs which have the capability to setup communications links, obtaining status data from DCE(s), providing control data to the DCE(s), presenting status data on a display and providing for user interaction. This memory may also make the status information available to more than one program. The present invention makes possible the ability to provide serial data communication to one application while providing status information to another application without affecting user data flow. Thus, multiple applications in the DTE may share status information.

While the invention has been described in detail herein in accord with certain preferred embodiments thereof, modifications and changes therein may be effected by those skilled in the art. Accordingly, it is intended by the appended claims to cover all such modifications and changes as fall within the true spirit and scope of the invention.

What is claimed is:

1. A first system for transmitting user data via a network to a second system and for receiving user data via said network from said second system, said first system comprising:

a data terminal equipment (DTE);

a data circuit-terminating equipment (DCE) connected to said DTE;

said DTE having a DTE processor, a DCE interface for conveying and receiving data to and from said DCE;

said DCE having a DCE processor, a DTE interface for receiving data from and conveying data to said DTE, a first memory space, a second memory space for storing status information and DCE configuration information, a communications circuitry adapted to convey data to said network from said first memory space and adapted to receive data from said network to said first memory space;

a user data path providing a serial communications port for conveying and receiving user data between said DTE and said DCE, said user data path including the DCE Interface, the DTE interface, the first memory space, the DCE processor and said communications circuitry; and a status information path providing status data to said DTE from said second memory space in said DCE, the status data including information unrelated to the user data path; said status information path including said second memory space, said DTE interface, said DCE interface, whereby said status data is obtained by the DTE without interrupting user data flow on said user data path.

2. The first system of claim 1 further comprising:

a control information path providing the DCE with control data from said DTE, said control information path including the DCE interface, the DTE interface and the second memory space, said DCE processor obtaining said control data from said second memory, whereby said control data is provided without interrupting user data flow on said user data path.

3. The first system of claim 1 further comprising:

a control information path providing the DCE with control data from said DTE, said control information path including the DCE interface, the DTE interface and a third memory space said DCE processor obtaining said control data from said third memory space, whereby said control data is provided without interrupting user data flow on said user data path.

4. The first system of claim 1 wherein said DCE is a PCMCIA card and the DTE contains a PCMCIA slot, the first memory space is PCMCIA I/O memory space, the second memory space is PCMCIA attribute memory space.

5. The first system of claim 2 wherein said DCE is a PCMCIA card and the DTE contains a PCMCIA slot, the first memory space is PCMCIA I/O memory space, the second memory space is PCMCIA attribute memory space.

6. The first system of claim 1 wherein said DCE is a PCMCIA card and the DTE contains a PCMCIA slot, the first memory space is PCMCIA I/O memory space, the second memory space is the PCMCIA common memory space.

7. The first system of claim 3 wherein said DCE is a PCMCIA card and the DTE contains a PCMCIA slot, the first memory space is PCMCIA I/O memory space, the second memory space is PCMCIA attribute memory space and third memory space is the PCMCIA common memory space.

8. The first system of claim 1 wherein said DTE includes a display and said status information obtained by the DTE via said status information path is presented on said display.

9. The first system of claim 1 wherein the status information includes remaining DCE battery power.

10. The first system of claim 9 wherein the status information includes received signal strength indicator.

11. The first system of claim 1 wherein the communication circuitry is coupled to an antenna adapted for providing signals to and receiving signals from a wireless network.

12. The first system of claim 3 wherein the communication circuitry is coupled to an antenna said antenna adapted for use with a wireless network.

13. The first system of claim 7 wherein the communication circuitry is coupled to an antenna adapted for providing signals to and receiving signals from a wireless network.

14. The first system of claim 2 wherein the DCE includes a interrupt generator, which generates an interrupt for the DCE processor when the DTE processor writes to said second memory address space via said control path.

15. A method in a data processing system for enhancing the efficiency of operation of a DCE coupled between a communication channel and a DTE system, said DCE having a data transfer mode and a command mode with a common memory, an attribute memory, and an I/O Memory, said method comprising the steps of:

coupling a first user data stream between a first DTE and a first DCE while said first DCE is operating in said data transfer mode where said first user data stream passes through the I/O memory of said DCE;

storing status information in the attribute memory of said first DCE; and obtaining status information from the attribute memory of said DCE by the DTE reading attribute memory of the DCE while said DCE continues to operate in said data transfer mode; and wherein said common memory space stores control command information, said attribute memory space stores the status information including information unrelated to the coupling of the first DTE and the first DCE, and said I/O memory space stores the user data.

16. The method of claim 15 where said first DCE updates the status information stored in the attribute memory.

17. The method of claim 15 wherein said status information includes battery power remaining.

18. The method of claim 15 further comprising the step of:

displaying the obtained status information.

19. The method of claim 15 further comprising providing a command stream from said first DTE to said first DCE while said DCE continues to operate in data transfer mode, where each command of said command stream is written to the common memory of said first DCE by said first DTE;

retrieving and executing each command from said common memory by the first DCE.

20. The method of claim 18 further comprising the steps of:

providing an update status command to the first DCE and in response the first DCE updates status information in the attribute memory of the DCE.

21. An adapter card comprising:

a bus connector a bus interface logic coupled to said bus connector;

a first memory having an I/O memory space and non I/O memory space;

a communications circuitry adapted for transmitting and receiving signals from a communications network;

a main processor coupled to the first memory, the bus interface, and the communications circuitry;

a user data path from said bus connector to said communications circuitry for a user data stream, the user data path including the bus interface logic, I/O memory space, and the main processor; and a status data path from said first memory to said bus connector via the bus interface logic, said main processor obtaining status information from said communications circuitry and writing said status information to said non-I/O memory space.

22. The adapter of claim 21 wherein said bus connector is a PCMCIA connector.

23. The adapter of claim 22 wherein an antenna is coupled to the communications circuitry, said antenna adapter for transmitting and receiving signals from a wireless communications network.

24. The adapter of claim 21 further comprising:

a control data path from said bus connector to said first memory via the bus interface logic, said main processor obtaining control information from said non-I/O memory space.

25. The adapter of claim 22 further comprising:

a control data path from said bus connector to said first memory via the bus interface logic, said main processor obtaining control information from said non-I/O memory space.

* * * * *